United States Patent [19]

Barski

[11] Patent Number: 4,866,784
[45] Date of Patent: Sep. 12, 1989

[54] SKEW DETECTOR FOR DIGITAL IMAGE PROCESSING SYSTEM

[75] Inventor: Lori L. Barski, North Chili, N.Y.

[73] Assignee: Eastman Kodak Company, Rochester, N.Y.

[21] Appl. No.: 266,268

[22] Filed: Oct. 26, 1988

Related U.S. Application Data

[63] Continuation of Ser. No. 127,305, Dec. 2, 1987, abandoned.

[51] Int. Cl.$^4$ .............................................. G06K 9/32
[52] U.S. Cl. ........................................... 382/46; 382/9
[58] Field of Search ................... 382/9, 44, 45, 46, 56; 340/727, 731; 358/261

[56] References Cited

U.S. PATENT DOCUMENTS

| | | | |
|---|---|---|---|
| 4,513,442 | 4/1985 | Scherl | 382/9 |
| 4,533,959 | 8/1985 | Sakurai | 382/46 |
| 4,558,461 | 12/1985 | Schlang | 382/46 |
| 4,610,027 | 9/1986 | Anderson et al. | 358/261 |
| 4,688,100 | 8/1987 | Haganuna et al. | 358/261 |
| 4,725,815 | 2/1988 | Mitchell et al. | 358/261 |

Primary Examiner—Leo H. Boudreau
Assistant Examiner—Joseph Mancuso
Attorney, Agent, or Firm—Robert M. Wallace

[57] ABSTRACT

Each line in a frame of video data is organized into continuous runs of white pixels, and those runs having lengths below a given threshold are transformed to black pixels. The data is then organized into runs of black pixels, and the start position of the longest black pixel run is noted for each horizontal line. Skew angle is computed from the offset distance between the noted black run start positions of successive lines. The offset angle is computed from the mean of a set of offset distances, the set being large enough to minimize the RMS standard deviation of offset distances below a predetermined value. The set of successive black runs fall in a staircase pattern whenever there is a non-zero skew angle.

22 Claims, 3 Drawing Sheets

SKEW DETECTOR FOR DIGITAL IMAGE PROCESSING SYSTEM

This is a continuation-in-part division of application Ser. No. 127,305, filed Dec. 2, 1987, abandoned.

BACKGROUND OF THE INVENTION

Optical character recognition systems and image processing systems generally are well-known in the art. One problem with such systems is that the printed material in a document being read in the system may be skewed at an angle with respect to the optical character recognition system orientation. This problem is called skew. It is not cost effective to rotate the document in the system scanner to eliminate the skew. The preferred method is to process the video data generated from viewing the document in such a manner as to remove the skew prior to image processing. One such data processing method is disclosed in U.S. Pat. No. 3,967,243, in which the skew is removed by normalizing vertical and horizontal second moments computed from the video data. This sort of computation is fairly sophisticated and potentially burdensome.

A simpler method is to organize the lines (rows) of video data generated by the document reader into successive columns of predetermined positions. In this method, disclosed in U.S. Pat. No. 4,558,461, whenever there is a sufficient number (e.g., one) of black pixels in a particular column in a given line of data, that entire column in that line (only) is then transformed to all black pixels. As a result, if the video data is skewed, a smeared staircase pattern appears. The skew angle may be easily computed from the shape of the staircase.

This latter method suffers from the disadvantage that the start position of each step in the staircase is fixed by the predetermined positions of the columns into which the rows of video data are organized and then smeared. This introduces a type of error which heuristically may be thought of as "quantization" error. More specifically, the edge of each step in the staircase pattern coincides with a boundary of one of the columns, the location of which is predetermined without regard to the contents of the video data. The accuracy of this process is limited by the minimum width of the columns into which the rows of video data may be organized. This is analogous to the quantization error typically encountered in analog-to-digital conversion, in which the accuracy is limited by the minimum step size of the digital quantization.

PROBLEM TO BE SOLVED

The problem is how to determine and subsequently remove skew in video data representing printed information before the data is fed to an image processing system without complex computations (such as the computation of second moments as in U.S. Pat. No. 3,967,243) and without introducing the types of errors encountered in the simpler processing techniques, such as the "quantization" error introduced by the simple technique of U.S. Pat. No. 4,558,461.

SUMMARY OF THE INVENTION

Video data representing the image of a printed document is de-skewed before being processed by an optical character recognition system. The skew detection and subsequent de-skewing is performed in accordance with the process of the invention by first organizing each row of the succession of rows of video data into run lengths of white ("off") pixels. A run length is defined by a succession of adjacent pixels, all of which are "off" or white. All of the white run lengths in each row of video data are compared against a threshold white run length. The pixels within only those white run lengths shorter than the threshold white run length are transformed to black pixels.

The next step is to organize the rows of video data anew, this time into run lengths of black pixels. For each row of video data, the longest black run length is selected, and its start location in the row is noted. Significantly, the start location of the selected black run length is determined by the contents of the image represented by the video data, and not by any arbitrary predetermination as in U.S. Pat. No. 4,558,461 discussed above. This guards against "quantization" error, as will be discussed below. The offset distances between successive run length start locations are also noted.

If the printed image represented by the video data is skewed about an angle, the pattern of selected black run lengths will correspond to a staircase pattern. The offset distance between each pair of adjacent steps in the staircase pattern provides a measure of the skew angle. (The angle is the tangent of the ratio of the step height to the offset distance.) Depending upon the number of steps in the staircase pattern, there is a statistical ensemble of offset distances (and corresponding individual skew angles) characterized by a standard deviation.

One feature of the invention is to compute the "mean" skew angle from the ensemble of offset distances (or individual skew angles) in the staircase pattern. In accordance with this feature of the invention, the number of successive offset distances or individual skew angles need only be sufficient to minimize the standard deviation of the ensemble below a threshold corresponding to a desired statistical confidence level.

Accordingly, before the average skew angle is computed from the ensemble of offset distances or individual skew angles, the following steps are taken to filter out unreliable data and to ensure that the remaining data corresponds to a true staircase pattern of black run lengths:

Offset distances between successive run lengths which fall outside of a specified range are discarded. Then, only continuous successions of run lengths are considered, in which none of the individual "steps" or run lengths in the pattern have been discarded for being out of range or for other reasons.

Next, the largest continuous succession of run lengths in the frame is inspected for reliability as follows: First, the sum of all of the differences between successive run lengths start positions is determined. This sum should either be a large negative number or a large positive number (depending upon the direction of the skew) whose absolute value exceeds a threshold magnitude. If this sum of differences does not exceed the threshold magnitude, this indicates that there are not enough samples and more video data is required to provide a reliable measure of the skew angle (or else the skew angle is negligible). Otherwise, the ensemble of offset distances (or individual skew angles) is inspected for reliability by computing its standard deviation. If the standard deviation is not below a threshold value corresponding to a selected statistical confidence level, then, again, more video data is required to provide a reliable computation of the skew angle. Otherwise, the data present in deemed sufficient to provide a reliable measure of the skew angle.

The skew angle is computed from the mean of the succession of skew angles (or offset distances) remaining after all of the foregoing filtering steps.

Solution to the Problem

The foregoing processing requires no computation of geometric moments or second moments of the video data (thus minimizing the amount of memory required, a significant advantage). Furthermore, the process of the invention minimizes or virtually eliminates quantization error in setting up a smeared staircase pattern from the video data. This is because the starting location of each step in the smeared staircase pattern is virtually exclusively a function of the content of the video data representing the printed image, and is not affected by an artifact of the data processing such as the type of "quantization" error discussed above. In fact, in the preferred embodiment of the invention, the accuracy of the individual start locations of the steps or individual black run lengths in the staircase pattern is limited only by the resolution or pixel size of the video data. This represents a significant advance in the art and overcomes the trade-off between accuracy or reliability vs. process simplicity.

DESCRIPTION OF THE DRAWINGS

The invention may be understood by reference to the accompanying drawings of which.

DETAILED DESCRIPTION

Figure 1A:
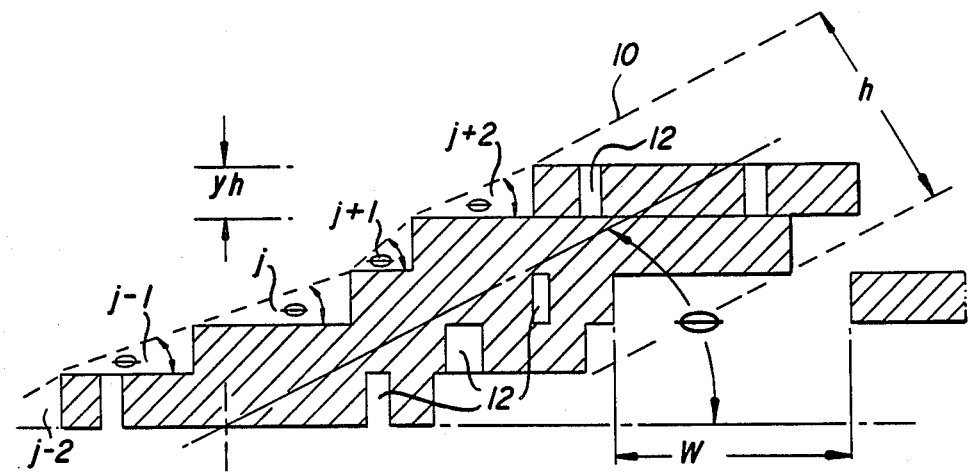
FIGS. 1a and 1b illustrate the run-length processing of the present invention.

Referring to FIG. 1a, a printed image represented by successive horizontal lines of video data may correspond to a straight line 10 having a thickness h subtended at a skew angle $\phi$ across the printed document or frame of video data. A reader scans the document to generate successive rows of video data. FIG. 1 illustrates the video data for rows $J-2, j-1, j, j+1, J+2$ (it being understood j begins at zero and ends at n, wherein n is the number of rows in the entire video frame representing the scanned document).

Due to uncertainties in the conversion of the printed image to video data, or due to imperfections in the original printed image itself from which the video data was created, the straight line 10 may not be represented by a perfectly contiguous area of black pixels (corresponding to the shaded regions in FIG. 1a). In fact, various "white" regions 12 may exist, as illustrated in FIG. 1a. These white regions are attributable to noise or other imperfections, but are not truly representative of the straight line 10, particularly if each of the regions 12 is of a width less than some threshold w.

Figure 1B:
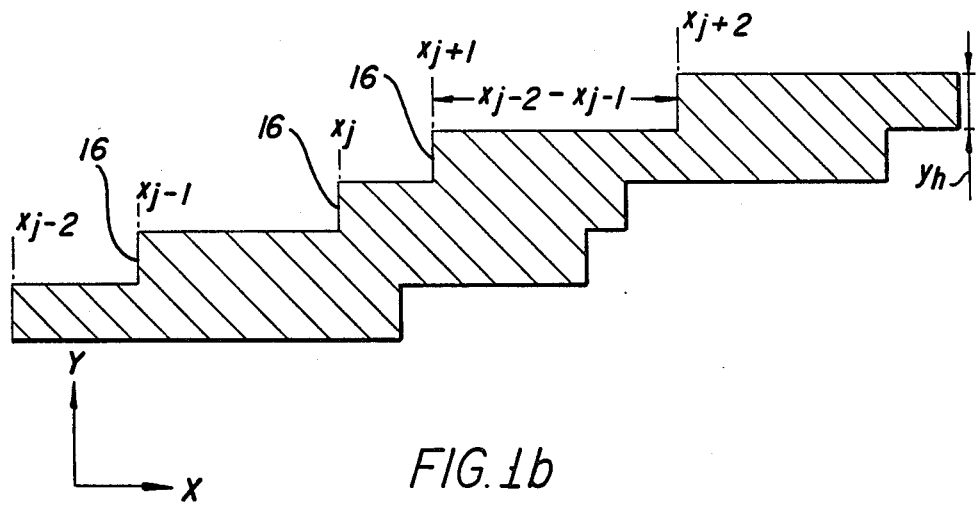

In order to smear the image, the invention organizes each horizontal line of video data illustrated in FIG. 1a into white run lengths. Each run length corresponds to one of the white areas 12 in FIG. 1a. The white pixels comprising each of those white run lengths 12 whose length is less than the threshold width w are all transformed to black pixels, in accordance with the process of the invention. This smearing process therefore "fills in" the white or blank areas 12 within the horizontal line 10 to produce the "smeared" staircase pattern of FIG. 1b. The next step of the invention is to organize each horizontal line of the smeared video data of FIG. 1b into black run lengths. The longest black run length in each horizontal line is then selected. In the case of FIG. 1b, the longest run length in each horizontal line corresponds to one of the individual steps 16 in the staircase pattern of black (shaded) pixels. The start location $x_j$ of the $j^{th}$ step, for example, is noted.

The process of the invention now ensures that the ensemble of run length start locations $x_j$ obey the following reliability criteria:

1. The offset distance $x_j - x_{j-1}$ between each pair of adjacent run lengths falls within an acceptable band.
2. There is a continuous succession of run length start locations, or, equivalently, there is no missing step in the staircase pattern of FIG. 1b.
3. The absolute value of the sum of all of the offset distances between adjacent steps in the staircase pattern of FIG. 1b exceeds a threshold magnitude.
4. The standard deviation of the ensemble of offset distances is less than a threshold value corresponding to a desired (previously selected) statistical confidence level.

In the presently preferred embodiment of the invention, the standard deviation determination of criteria 4 above is replaced by the much simpler process of monitoring the differences between successive mean values of the offset distances. (As each new offset distance is added to the ensemble of individual offset distances, a new mean value must be computed.) Once the difference between successive mean values falls below a predetermined threshold (signifying a stabilizing convergence of the mean values), the ensemble of individual differences between successive offset distances is sufficiently large to enable computation of the skew angle from the mean offset distance.

Alternatively, instead of collecting an ensemble of offset distances and computing their mean value, an individual skew angle may be computed for each offset distance to generate an ensemble of skew angles whose mean value is then computed and monitored.

In the example of FIG. 1b, the foregoing criteria are all met, and the offset angle $\theta$ is computed by first computing the individual offset angles $\theta_j$ defined at each step of the staircase of FIG. 1a. Then, the average of all $\theta_j$'s is taken, and it is this average which is output as the skew angle. (Alternatively, the skew angle is determined from the average of all offset distances $(x_j - x_{j-1})$.)

Figure 2:
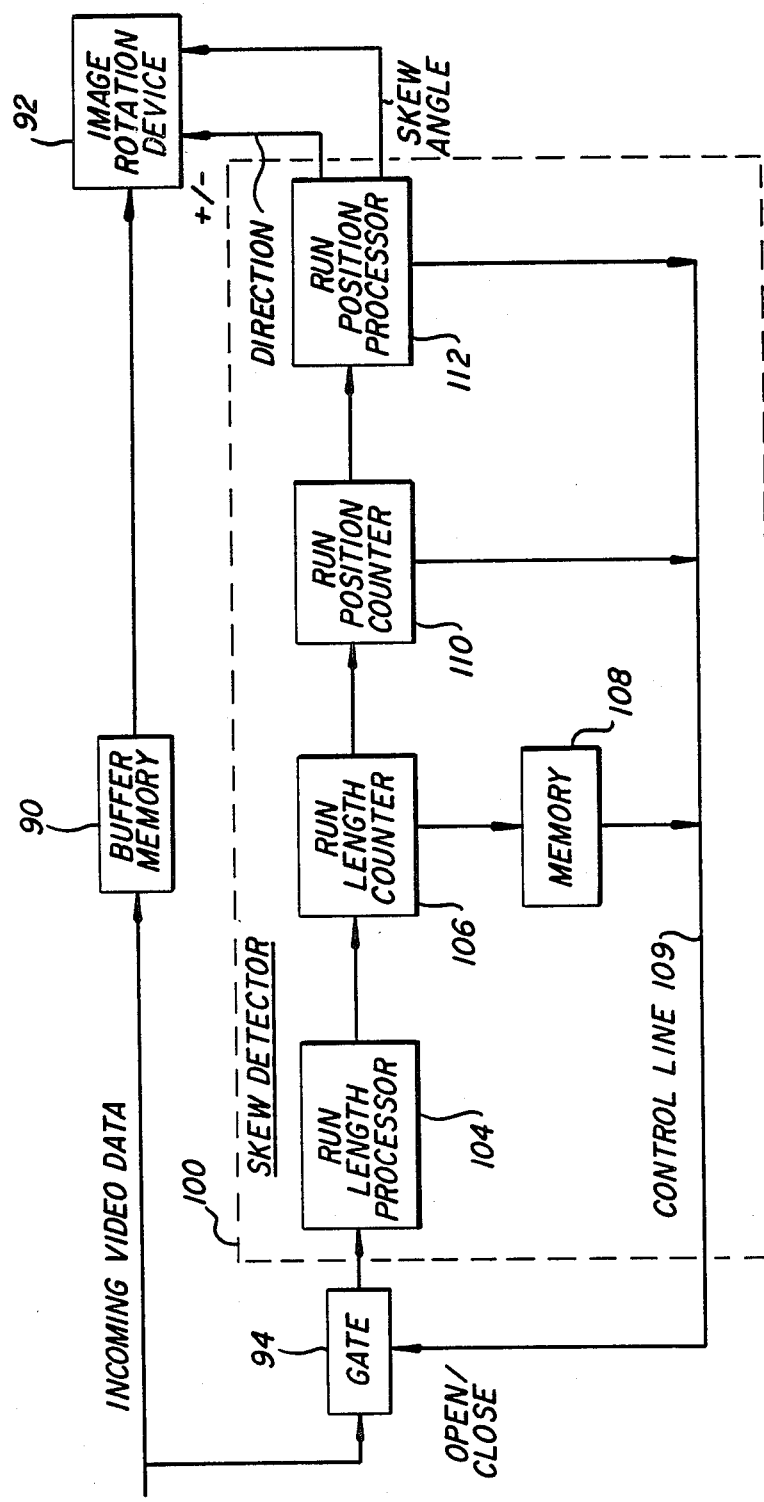
FIG. 2 illustrates the system of the invention.

The system of the invention is illustrated in FIG. 2. Incoming video data is temporarily stored in a buffer memory 90 before being sent to an image rotation device 92. The image rotation device 92 is of the type well-known in the art, and, in response to a known skew angle, rotates the image represented by the video data so as to remove the objectionable skew present in the original image. The problem is to detect and measure the precise skew angle and furnish this information to the image rotation device 92.

For this purpose, the incoming video data stored in the buffer memory 90 is simultaneously admitted through a gate 94 to a skew detector 100. The skew detector includes a run length processor 104, a run length counter 106, a run position counter, a memory 108, a run position counter 110 and a run position processor 112.

The run length processor 104 monitors white run lengths in each line of the incoming video data and transforms all white pixels in any white run length below a predetermined threshold length to black pixels. This smears the data. Next, the run length processor 104 monitors black run lengths in each line of incoming video data and furnishes their locations to the run length counter 106. The run length counter 106 determines the starting pixel position of the longest black run length in each video line. All starting positions thus determined are stored in the memory 108. Until the memory 108 stores a predetermined number of such start positions, it continues to direct the gate 90 via a control line 109 to admit additional lines of incoming video data.

The run position counter 110 accumulates the differences (both positive and negative) between successive run length starting positions stored in the memory 108. The run position counter continues to direct the gate 90 via the control line 109 to admit successive lines of the incoming video data until the total accumulated difference exceeds a predetermined threshold, indicating that there is enough data to detect a skew angle.

The run position processor 112 monitors the standard deviation (or an equivalent parameter) of the ensemble of individual differences between successive run start positions received from the run position counter 110. Until the standard deviation (or equivalent parameter) indicates that a predetermined statistical level of confidence has been reached in the ensemble of individual differences, the run position processor 112 continues to direct the gate 90 via the control line 109 to admit successive lines of the incoming video data. As soon as the predetermined level of confidence has been reached, the run position processor 112 computes the mean value of the ensemble of individual differences between successive black run length start locations. The run position processor 112 then determines the skew angle by computing the arc-tangent of the ratio of the distance between adjacent horizontal lines in the incoming video data to the mean value of the ensemble of individual start locations. The skew angle thus determined is transmitted along with an indication of the skew direction (+ or −) to the image rotation device 92. The system of FIG. 2 performs this process at least once in each frame of incoming video data (assuming that all of the video data in a given frame is characterized by the same skew angle). It may perform the process more or less often, depending upon the user's requirements or the nature of the incoming video data.

Preferably, the run position processor 112 determines whether the ensemble of differences furnished by the run position counter 110 meet the criteria 1–4 given above. If the criteria are not met, the processor 112 causes the gate 90 to admit additional video data so that additional black run length start locations may be computed. Once the criteria 1–4 have been met, the black run length start locations are processed by a skew computing processor 28 so as to compute the average skew angle from the individual start locations, or start location differences or individual skew angles $\theta_j$, as described above.

Figure 3A:
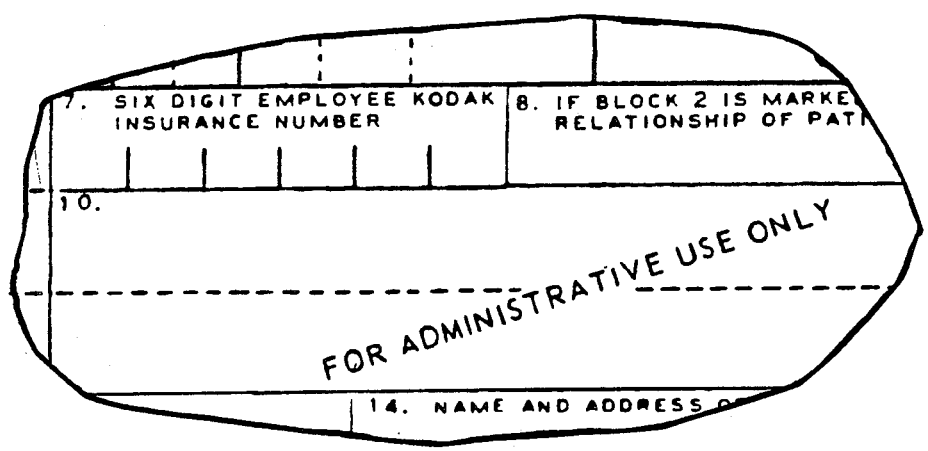
FIGS. 3a and 3b illustrate examplary results of the run length processing of the invention.
Figure 3B:
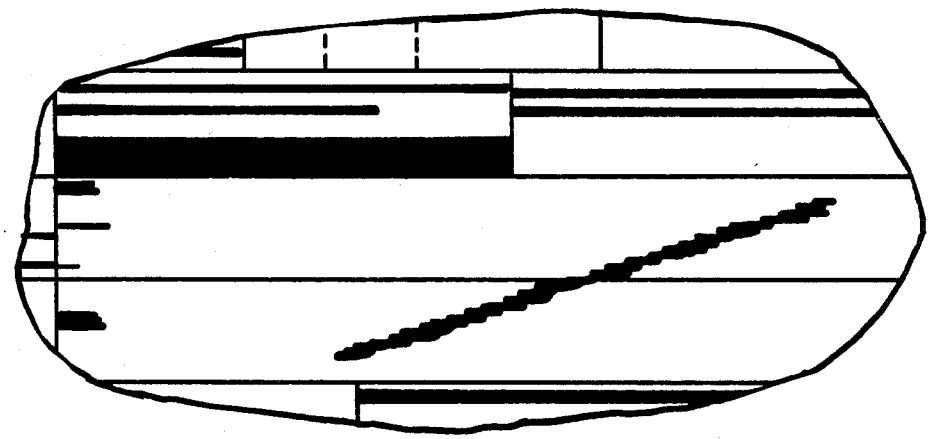

An actual example of the staircase pattern achieved using the run length processing of the invention is illustrated by comparing the input image of FIG. 3a with the processed image of FIG. 3b (which was computed from the input image of FIG. 3a in accordance with the foregoing described process). Note that the slanted printing, "for administrative use only" in FIG. 3a results in a spurious staircase pattern in the corresponding location of FIG. 3b. However, since each of the black run lengths resulting therefrom are not the longest black run lengths in each horizontal video line, this spurious staircase pattern is ignored, in accordance with the invention.

In the preferred embodiment of the invention, the algorithm executed by the system of FIG. 2 is as follows:

1. Load the next block of n lines of video data.
2. Do for j=1 through n:
3. Receive data of video line j.
4. Organize into white run lengths.
5. Transform pixels in white run lengths of length less than w to black pixels.
6. Organize video data lines into black run lengths.
7. Select the longest black run length $r_j$ in line j.
8. Determine the start location $x_j$ of $r_j$.
9. Determine the number $D_j$ of black pixels in line j.
10. Determine $x_j - x_{j-1}$ and $\theta_j$=tangent $(y_h/(x_j - x_{j-1}))$.
11. If j<n, then j=j+1 and go to 3.

otherwise:

12. Do for j=1 through n:
13. If $x_j - x_{j-1}$ is greater than $x_{max}$ or less than $x_{min}$ discard all data from video line j.
14. If $D_j < D_{min}$, disregard all data corresponding to video data line j.
15. If j<n, j=j+1 and go to 13.

Otherwise:

16. Do for j=1 through n:
17. If $r_{j-1}$ and $r_{j+1}$ have been discarded in any previous step, discard all video data corresponding to video line j.
18. If j<n, j=j+1 and go to 17.

Otherwise:

19. For all j's not discarded so far, compute the following:

$$d = \sum_{j=1}^{N} x_j - x_{j-1}$$

and $\sigma(\theta_j)$=standard deviation of all $\theta_j$'s.

20. If $d < d_t$ or if $\sigma(\theta_j) > \sigma_t$, go to 1.

Otherwise:

21. Count the number m of $\theta_j$ not discarded thus far.
22. Compute $$\theta = (1/m) \sum_{j=1}^{N} \theta_j.$$

23. If $\theta$ is greater than $\theta_{max}$ or is less than $\theta_{min}$ stop. Flag error.

Otherwise:

24. Output $\theta$ and the polarity (+ or −) of d.

In the foregoing skew correction algorithm, the following limits on each of the quantities specified therein are selected as follows:

In step 13, the offset distance $x_j - x_{j-1}$ had to be greater than $x_{min} \cdot x_{min}$ corresponds to the minimum skew angle which the system can recognize. Ideally, this is only limited by the minimum pixel resolution size of the video system, and may be determined readily by the skilled worker. Furthermore, the offset distance $x_j - x_{j-1}$ had to be smaller than $x_{max} \cdot x_{max}$ corresponds to the maximum skew angle which the optical character recognition system can handle and correct. This is determined in accordance with the optical character recognition system requirements. In one example, the minimum angle $x_{min}$ is 0.08° and the maximum angle $x_{max}$ is 4.0°.

Step 14 of the invention required that the number $D_j$ of black pixels in a given horizontal video line (j) had to be greater than a threshold number $D_{min}$. This threshold number may be selected by the skilled worker in such a manner as to ignore a "spurious" staircase pattern such as that illustrated in FIGS. 3a and 3b corresponding to the slanted label "for administrative use only" in the otherwise unskewed printed image of FIG. 3a.

Step 20 required that the absolute value of the sum d of the offset distances be greater than a threshold magnitude $d_t$. This threshold magnitude may be selected to be the number m of individual offset distances comprising the sum d multiplied by the arc cotangent of the minimum correctable angle (e.g., 0.08°). The skilled worker may select any other suitable criteria for $d_t$.

Finally, the standard deviation $\sigma(\theta_j)$ of the ensemble of individual skew angles $\theta_j$ was required in step 20 to be less than a threshold standard deviation $\sigma_t$. $\sigma_t$ is computed from the number m of samples in the ensemble and a statistical confidence level and probability value selected by the user. Assuming that the ensemble of individual skew angles $\theta_j$ obey Gaussian statistics, $\sigma_t$ is easily determined in accordance with well-known principles or by simply looking up in a table which correlates probability values, confidence levels and number of samples.

Step 23 required that the average skew angle $\theta$ be no greater than $\theta_{max}$ and no less than $\theta_{min}$. Again, $\theta_{max}$ and $\theta_{min}$ may, in one example, be selected to correspond to 0.08° and 4.0°, respectively.

The skew correction algorithm of steps 1 through 23 above is just one of many possible examples for implementing the invention. It may be readily modified. For example, the roles of the white pixels and black pixels may be reversed in the first two steps of the run-length processing, so that a "white" staircase is formed, rather than the "black" staircase of FIG. 1b. Accordingly, it is understood that, while the invention has been described in detail with particular reference to preferred embodiments thereof, variations and modifications may be made without departing from the spirit and scope of the invention.

What is claimed is:

1. A de-skewing system for use in an optical character recognition system, said de-skewing system comprising:
   means for receiving and storing successive lines of video data representing an image, each of said lines of video data comprising successive viedo pixels, each of said successive pixels characterized by at least first and second values;
   means for:
   a. organizing said lines of video data into first run lengths comprising continuous successions of pixels characterized by said first value;
   b. transforming the pixels in those of said first run lengths characterized by a length less than a first threshold length into pixels characterized by said second value;
   c. organizing the lines of video data transformed by said transforming means into second run lengths comprising continuous successions of pixels characterized by said second value, each of said second run lengths characterized by a start location in the corresponding line of said video data, so as to generate an ensemble of start locations of said second run lengths;
   d. a computing an average skew angle from said ensemble of start locations of said second run lengths.

2. The de-skewing system of claim 1 wherein said means for computing an average skew angle from said ensemble of start locations comprises:
   means for selecting the start location of the longest second run-length in each video line and computing offset distances of pairs of successive ones of said start locations.

3. The de-skewing system of claim 2 wherein said means for computing said average skew angle further comprise:
   means for computing discrete skew angles from each of said offset distances and computing the average of all of said skew angles.

4. The de-skewing processor of claim 2 wherein said means for computing said average skew angle further comprise:
   means for computing the average of all of said offset distances and computing said skew angle from said average of said offset distances.

5. The de-skewing system of claim 2 further comprising:
   means for discarding any of said second run lengths and the corresponding start locations thereof corresponding to offset distances falling outside the predetermined range.

6. The de-skewing system of claim 5 further comprising means for discarding the data of any line of video data not included in a succession of lines of video data which have not been discarded by said means for discarding.

7. The de-skewing system of claim 6 wherein said means for inhibiting responds only to those lines of video data which have not been discarded by any of said means for discarding.

8. The de-skewing system of claim 1 further comprising:
   means responsive to said means for computing said start locations for computing the standard deviation of said start locations and, whenever said standard deviation exceeds a predetermined standard deviation value, for inhibiting said means for computing a skew angle, and for signaling said means for storing said video data to obtain additional lines of said video data, whereby said ensemble of second run length start locations may be augmented.

9. The de-skewing processor of claim 1 further comprising means for discarding the video data of any of the said lines of video data in which the number of pixels characterized by said second value is less than a predetermined threshold pixel number.

10. The de-skewing system of claim 9 further comprising means for discarding the data of any line of video data not included in a succession of lines of video data which have not been discarded by said means for discarding.

11. The de-skewing system of claim 10 wherein said means for inhibiting responds only to those lines of video data which have not been discarded by any of said means for discarding.

12. A method for reliably determining the skew angle in video data organized into video lines of sucessive pixels, each of said successive pixels being characterized by one of first and second values, said method comprising:

a. organizing at least some of said lines of video data into first run lengths comprising continuous successions of pixels characterized by said first value;

b. transforming the pixels in those of said first run lengths characterized by a length less than a first threshold length into pixels characterized by said second value;

c. organizing each of said lines of the video data transformed by said transforming step into second run lengths, comprising continuous successions of pixels characterized by said second value, each of said second run lengths characterized by a start location in the corresponding line of said video data, so as to generate an ensemble of start locations of said second run lengths;

d. a computing an average skew angle from said ensemble of start locations of said second run lengths.

13. The method of claim 12 further comprising:
sensing whenever said ensemble of starting positions does not correspond to a sufficiently large skew angle or a sufficiently small standard deviation and inhibiting said skew angle computing step until an additional amount of lines of video data are received and processed in steps a–c.

14. The method of claim 13 further comprising:
discarding prior to said determining step any of said start locations not falling in a continuous succession of start locations.

15. The method of claim 14 further comprising:
determining prior to said second determining step whether any of said start locations correspond to an offset angle with an adjacent start location not falling within a preselected bound, and discarding said start location in response thereto.

16. A method for reliably determining the skew angle in video data organized into video lines of successive pixels, each of said successive pixels being characterized by one of first and second values, said method comprising:

receiving and storing, successive lines of video data representing an image, each of said lines of video data comprising successive video pixels, each of said successive pixels characterized by at least first and second values;

forming a succession of white run lengths in each of said lines of video data and transforming individual pixels in those of said white run lengths characterized by a run length shorter than a threshold white run length;

forming a succession of black run lengths in each of said rows of video data transformed by said transforming step and selecting that black run length having the longest length in a given row, so as to form an ensemble of black run lengths and corresponding black run length start locations and a corresponding ensemble of offset distances between the black run length start locations of adjacent rows of said video data; and computing an average skew angle from said ensemble of offset distances.

17. The method of claim 16 further comprising:
determining whether any of said offset distances are unreliable and disarding them if they are unreliable before performing said step of determining said average skew angle.

18. The method of claim 17 further comprising:
discarding any of said offset distances not falling in a continuous succession of offset distances after said discarding step prior to said step of determining said skew angle.

19. The method of claim 17 wherein said reliability determining step comprises determining whether a given offset distance falls within a predetermined limit.

20. The method of claim 16 further comprising:
computing the standard deviation of said ensemble of offset distances and inhibiting said skew angle determining step until additional video data is received with which to augment said ensemble until said standard deviation is decreased below said standard deviation threshold.

21. The method of claim 16 further comprising:
computing a new mean value from said ensemble of offset distances whenever an additional offset distance is added thereto so as to produce successive means values, and inhibiting said skew angle determining step to allow additional video data to be received with which to augment said ensemble until the difference between later ones of said successive mean values falls below a predetermined threshold.

22. The method of claim 21 wherein said successive mean values computed from said ensemble are computed by first computing an individual skew angle for each offset distance to produce an ensemble of skew angles from said ensemble of offset distances and then computing the mean value of said ensemble of skew angles.

* * * * *